United States Patent Office 2,910,379
Patented Oct. 27, 1959

2,910,379

METHOD OF COATING GRAPHITE WITH STABLE METAL CARBIDES AND NITRIDES

David H. Gurinsky, Center Moriches, N.Y., assignor to the United States of America as represented by the United States Atomic Energy Commission No Drawing. Application July 18, 1956
Serial No. 598,724

4 Claims. (Cl. 117—65)

The present invention relates to a method for forming stable nitride and carbide compounds on the surface of graphite.

Liquid or fused heavy metals have been found very useful in transferring heat within high temperature heat generation and transfer apparatus. They have also been shown to be very useful as solvents and carrying media for fissionable materials in nuclear reactors. When applied to such use, the liquid metals which contain the nuclear fuel may also be employed to transfer the heat generated by the fissioning of the fuel.

One problem involved in the use of fused metals in heat generation and transfer apparatus is the tendency of the metals to attack and react with the containers. Graphite has proven to be a useful container material because of its resistance to attack by fused metals. However materials which are incorporated into the fused metal for use in reactors have been found to react with the graphite surface. For example, uranium dissolved in liquid metal media has been found to react at high temperatures with graphite containers to form carbides of uranium. It is preferred that the uranium remain in the liquid phase in order that the heat may be generated in, as well as transported from, the reactor core in the liquid metal.

The products of the fissioning of nuclear fuels also tend to react with, absorb and/or adsorb on the graphite surface and can constitute a serious source of poisoning of a reactor since they have high neutron capture cross sections and they are difficult to remove.

Accordingly, one of the objects of the subject invention is to protect graphite surfaces against reaction with nuclear fuels and fission products. It is another object to provide graphite containers which resist attack by carbide forming elements. It is a further object of the present invention to contain nuclear fuels in liquid metals without loss of the fuels from the liquid. A further object is to render the graphite surface exposed to fused metals relatively non-reactive with respect to elements contained in the fused metal.

Another problem encountered in making use of graphite in containing nuclear fuels in liquid metals is the tendency of films to form at the surface of the liquid metal, or interface of the liquid metal and container graphite. Such surfaces may serve as a collection point for certain gaseous substances, such as fission products, in the liquid. One of the objects of the invention is to increase the wetting of the solid by the liquid metal in order to decrease the tendency toward gas film formation at the surfaces. Other objects will be in part apparent and in part pointed out in what follows.

In one of its broader aspects, the objects of the invention are achieved by contracting a graphite surface with a fused heavy liquid metal containing zirconium, titanium and hafnium dissolved or finely dispersed therein to form a carbide and nitride of at least one of the dissolved metals on the graphite surface contacted.

The results of a number of tests illustrating some of the methods of practicing the subject invention in forming metal carbides are given in the following table. The procedures used are those described in volume 9 of the Proceedings of the International Conference on the Peaceful Uses of Atomic Energy. However, it will be understood that numerous other procedures for controlling the concentration, introduction and removal of ingredients and purification thereof may be employed.

In general, the liquid metals specified were contacted with a graphite surface for the indicated length of time by placing samples of the metals in graphite crucibles and equilibrating them with the liquid metal under a helium atmosphere at the temperature, and for the length of time noted. The liquid metal specimens contained amounts of other metals as indicated in the column labeled "additives."

After cooling in the furnace each crucible was removed and sectioned into slices. At least one cross sectional slice of each sample was polished and examined microscopically for layer formation at the interface of the graphite and metal. The containing graphite wall of one of the slices, i.e., that exposed to the liquid metal, was machined to leave a graphite thickness of about 0.010 inch. X-ray diffraction patterns were taken through the remaining graphite to identify any surface deposits that might have formed at the carbon-metal interface. The graphite used in these tests was one impervious to liquid metals which are not under pressure. The results are summarized as follows:

TABLE.—REACTION BETWEEN GRAPHITE CRUCIBLES AND U—Bi SOLUTIONS AT ELEVATED TEMPERATURES

| Sample | Liquid Metal | Additives (weight percent) | Temp., °C. | Time, hrs. | Surface Deposits | |
|---|---|---|---|---|---|---|
| | | | | | Identified by X-ray Diffraction | Visible at 250 X |
| $C_3$ | Bi | U—0.05 | 850 | 28 | UN | None. |
| $C_5$ | Bi | U—0.42, Mg—0.18, Zr—0.18 | 1,000 | 96 | MgO, ZrC+ZrN | None. |
| $C_6$ | Bi | U—1.0 | 1,000 | 100 | None | None. |
| $C_7$ | Bi | U—1.0, Zr—0.3 | 1,000 | 100 | ZrC+ZrN | None. |
| $C_8$ | Bi | U—1.0 | 1,200 | 120 | None | None. |
| $C_9$ | Bi | U—1.0, Zr—0.3 | 1,200 | 120 | ZrC+ZrN | Yes. |
| $H_1$ | Bi | U—4.7 | 1,100 | 96 | UC | Yes—est. 120μ. |
| $C_{10}$ | Pb-Bi eut. | U—1.0 | 1,000 | 96 | UC | Yes. |

TABLE—Continued

| Sample | Liquid Metal | Additives (weight percent) | Temp., °C. | Time, hrs. | Surface Deposits Identified by X-ray Diffraction | Surface Deposits Visible at 250 × |
|---|---|---|---|---|---|---|
| $C_{11}$ | Pb-Bi eut. | U—1.0 / Zr—0.3 | 1,000 | 96 | ZrC+ZrN | None. |
| $T_1$ | Pb-Bi eut. | U—2.0 | 1,000 | 100 | UC | Yes—20μ. |
| $T_2$ | Pb-Bi | U—2.0 | 900 | 100 | UC | Yes—4μ. |
| $H_6$ | Pb-Bi | U—4.2 / Zr—0.36 | 1,100 | 96 | ZrC+ZrN | None. |
| $C_{14}$ | Pb-Bi | U—1.0 | 1,000 | 96 | Not examined. | Yes. |
| $M_3$ | Pb-Bi | Zr—0.54 | 1,000 | 100 | ZrC | None. |
| $M_8$ | Pb-Bi | Zr—0.51 | 1,100 | 96 | ZrC | Yes—1.5μ. |
| $M_{16}$ | Pb-Bi | Zr—0.52 | 1,200 | 100 | ZrC | Yes—3.5μ. |
| $M_{17}$ | Pb-Bi | Zr—1.0 | 1,200 | 100 | ZrC | Yes—3.5μ. |

With regard first to the formation of uranium carbide, it can be seen from samples $C_2$, $C_6$ and $C_8$, that when uranium was added to bismuth in concentrations of 1% or less no uranium carbide was detected at temperatures up to 1200° C. When the uranium addition was increased to 4.7% surface deposits of uranium carbide were detected at 1100° C.

The addition of zirconium to the liquid bismuth in all samples at temperatures of 1000° C. or higher produced surface deposits of a solid solution of zirconium carbide with zirconium nitride. These deposits can be formed preferentially to the uranium carbide as evidenced from samples $C_5$, $C_7$, $C_9$, $C_{11}$, and $H_6$. The carbides formed at temperatures below 1200° C. were identifiable by X-ray diffraction but were not visible on microscopic examination at a 250 times magnification. Those samples prepared at 1200° C. and above gave surface deposits which were visible at this magnification, e.g., sample $C_9$.

It can also be observed from the results given in the table, that in the lead-bismuth eutectic, the uranium carbide forms from lower concentration of uranium at temperatures below 1200° C. but that even in this case, the solid solution of carbide and nitride of zirconium may be formed preferentially to the formation of the uranium carbides. The formation of detectable uranium carbide deposits is prevented.

It will further be noted from the test $H_6$ of the table that the deposit containing zirconium forms preferentially although the weight ratio of uranium to zirconium in the solution is as high as 11.72 to 1, corresponding to an atom ratio of 4.52 to 1. Based on the results in the table and other tests, the minimum temperature of formation of the zirconium containing deposit on the graphite is estimated to be 550° C. Thicker layers are formed at higher temperatures. To form thicker layers, higher temperatures, above 1000° C., are preferred as it has been found that a highly protective layer of ZrC—ZrN can be formed at that temperature within a relatively short time in the order of four days. A smaller dependency on concentration was found. It is therefore necessary to employ a concentration of zirconium only slightly greater than that sufficient to form a layer of the desired thickness, although higher concentrations may be employed.

A number of graphite materials were investigated including an especially pure graphite containing little free carbon, a pressed natural graphite bonded with carbon, and a pure porous graphite, as well as the graphite which is impervious to liquid metals which are not under pressure. The thickness of deposits formed was essentially the same for all four types of samples under the same experimental conditions and is presumably so for any graphite sample.

Metallographic examination of the deposits formed indicated that the ZrC—ZrN deposit was tightly adherent as contrasted with the loose non-adherent layer of uranium carbide. A comparison of autoradiographs made from cross sections of the samples produced by a result of tests $C_{11}$ and $C_{14}$ demonstrated that the radiation halo outlining the surface of the crucible of test $C_{14}$, and indicating the presence of uranium at this surface, was completely eliminated in the sample of test $C_{11}$, to which 0.3% zirconium had been added. Further, the uranium was found to be distributed completely throughout the lead-bismuth matrix of the sample of test $C_{11}$.

From the foregoing, it is evident that the preconditioning of graphite to form a layer of zirconium carbide and nitride, where a liquid metal containing uranium is to be employed in contact with the graphite is not necessary as the presence of zirconium, to the extent of only a fraction of the amount of uranium present, will result in the preferential formation of zirconium carbides to leave the uranium in the solution. Preconditioning, that is the formation of a protective layer of the carbide and nitride of zirconium, hafnium or titanium or combinations of these metals, may be desirable when the graphite is to be exposed to metals forming carbides or nitrides more stable than uranium carbide.

In a test to demonstrate the utility of graphite in connection with containing liquid metal solutions of uranium, in steel and graphite systems, it was found that where these materials have been contacted with bismuth containing zirconium and magnesium, and the concentration of these elements in the bismuth has reached a steady value, the addition of uranium resulted in an initial loss in the order of only a few percent the concentration of uranium added. Thereafter the concentration remained constant during a period of 2000 hours.

From the foregoing, it is evident that the present invention provides an effective method for protecting graphite surfaces against reaction with uranium. Graphite surfaces are protected against other carbide and nitride-forming metals in liquid metals due to the very high stability of the carbides and nitrides of zirconium, hafnium and titanium. The nitrogen which enters into reaction with the metals selected from this group is that which is normally present in graphite and which diffuses to the graphite surfaces at the elevated temperatures employed.

It has further been found that contact between graphite and liquid metal, or the wetting of the graphite, is enhanced by the formation on the graphite of a layer of a carbide and nitride of one of the selected metals. This wetting eliminates layers of gas which tend to form at the metal solid interface. Graphite containers particularly suitable as heat transfer apparatus for use in connection with nuclear reactors may be produced in the practice of the invention. For example a carbon element may be perforated with a number of channels adapted to be interconnected into flow paths for separate streams of liquid metals. The channel surfaces may be protected according to the method of this invention and the element may thereafter be employed in the transfer of heat from one liquid metal stream to the other. Because of the low neutron capture cross section of zirconium, layers containing zirconium are preferred to this application.

The formation of the protective layers is useful in addition in reducing the attack of graphite by such substances as liquid sodium, sodium-potassium eutectic and similar compositions. The extent of such attack is reduced because it is possible in practicing the subject invention to coat the entire graphite surface, not only its apparent surface. This is accomplished by introducing a solution of at least one of the selected metals in a heavy liquid metal into the pores of the graphite with the aid of pressure and thereafter raising the temperature of the graphite to cause the reaction of the selected metal and graphite. It is preferred in following this procedure to permeate the graphite with the liquid containing the unreacted selected metal at a lower temperature, and thereafter to bring about a protective layer formation by raising the temperature to above 1000° C. The pressure necessary to impregnate graphite with liquid metal solutions depends on the porosity of the graphite. A pressure of only a few pounds per square inch is necessary to impregnate pile grade graphite having a density of about 1.7. In this connection subjecting the graphite to vacuum at the time the impregnation is carried out, is of assistance. Higher pressures may be employed to impregnate more dense graphite. A lower liquid metal temperature at which the solvent metal is liquid and its viscosity is low, for example a temperature of about 450° C. for bismuth solutions, is satisfactory for this purpose. The liquid metal may be removed after formation of the protective layer by purging with gas, by distillation or by other suitable methods.

The product of this reaction is a graphite element the entire surface of which, both internal and apparent, is coated with a layer of the protective carbide and nitride.

Heavy liquid metal solvents for the selected metals other than those indicated above may be employed in forming the protective coatings. For example solutions of zirconium, titanium and hafnium in lead or other heavy liquid metals having densities above 5 may be employed.

Since many embodiments might be made in the present invention and since many changes might be made in the embodiment described, it is to be understood that the foregoing description is to be interpreted as illustrative only and not in a limiting sense.

I claim:

1. The method of forming a graphite element the entire surface of which is coated with a layer of the nitride and carbide of at least one metal selected from the group consisting of zirconium, titanium and hafnium which comprises permeating said element with a solution of at least one of the selected metals in a liquid metal solvent having as its principal ingredient at least one metal of the group consisting of lead and bismuth, raising the temperature of the solution to a temperature in the order of 1000° C. and thereafter distilling the solvent metal of said solution from said element.

2. The method of preventing reaction between graphite and uranium in contact with the graphite in the form of a bismuth solution containing more than 1% uranium, which comprises introducing zirconium to the extent of at least $\frac{1}{10}$ of the concentration of uranium present, contacting the graphite with the solution and heating the composition to a temperature of approximately 1000 to 1200° C.

3. The method of preventing reaction between uranium and carbon where said uranium is present in the form of a solute in liquid eutectic lead-bismuth composition which comprises dissolving in said eutectic a metal selected from the group consisting of zirconium, titanium and hafnium, bringing said dissolved metal in contact with graphite and heating to a temperature of about 1200° C., and thereafter contacting the contacted surface of said graphite with a lead-bismuth eutectic composition containing uranium dissolved therein.

4. The method of forming a layer of zirconium carbide and zirconium nitride on graphite sufficient to protect said graphite against reaction with uranium dissolved in liquid metal having a melting point below 550° C. which comprises dissolving zirconium in said liquid metal, contacting the graphite surface to be protected with the liquid metal solution, heating the contacted surface to a temperature in excess of 1000° C., maintaining the zirconium containing solution in contact with said graphite surface for approximately four days at said temperature and thereafter contacting the surface protected with zirconium carbide and nitride with liquid metal containing uranium dissolved therein.

References Cited in the file of this patent

UNITED STATES PATENTS

| 2,548,897 | Kroll | Apr. 17, 1951 |
| 2,779,073 | Osborn | Jan. 29, 1957 |

OTHER REFERENCES

Proceedings of the International Conference on the Peaceful Uses of Atomic Energy, vol. 9, pages 341–343.